Figure 1:
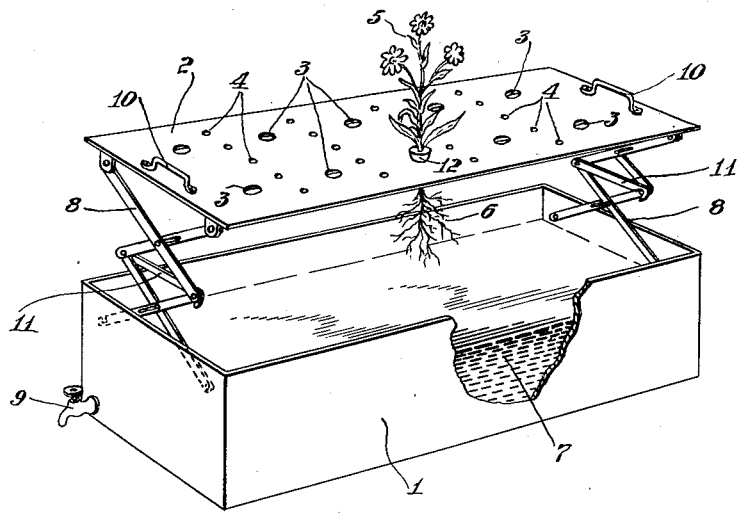

Feb. 6, 1940.                M. W. SWANEY                2,189,510
                         HYDROCULTURE PLANT BOX
                          Filed June 16, 1938

INVENTOR
Miller W. Swaney

Patented Feb. 6, 1940

2,189,510

UNITED STATES PATENT OFFICE 2,189,510

HYDROCULTURE PLANT BOX

Miller W. Swaney, Bloomfield, N. J., assignor to Ellis Laboratories, Inc., a corporation of New Jersey Application June 16, 1938, Serial No. 214,035

4 Claims. (Cl. 47—1.2)

This invention relates to a box or tank adaptable for the growing of flowers, vegetables and other plants. It involves more particularly the propagation of plant growth by aqua-culture or hydroculture methods, and without the use of soil.

When grown in soil, particularly in boxes or containers of limited size, plants require a great deal of attention. For example, these plants must be regularly watered in order to prevent them from drying and wilting. Thus, they cannot be allowed to remain unattended for appreciable periods of time if good growth is to be secured. Another factor of prime importance in growing plants in soil is that of providing the plant with sufficient food. The quantity of nutrients necessary and the rate at which they must be supplied of course depends largely on the type of soil used and upon the latter's nutritive and pathological condition. Because of these considerations, most plants grown either indoors or outdoors in window boxes or other containers filled with soil often suffer because of malnutrition, faulty irrigation, caking of soil, soil diseases and other deleterious causes.

In the growing of plants in window boxes filled with soil the following obstacles are often encountered:

1. Difficulty of obtaining rich soil.
2. Presence of harmful pathogenic organisms in the soil.
3. Depletion of plant food present in soil.
4. Density of soil makes box too heavy to be conveniently transported.
5. Plants require daily attention, i. e., watering to keep plants from drying and wilting.
6. Plant roots continually excrete toxic materials. These toxic substances may accumulate in a limited amount of soil confined in a box and eventually poison the plants contained therein.
7. When plants are removed from box, roots are torn away and remain behind to decay and give rise to harmful soil diseases.
8. Since soil dries out, boxes, if made of wood, tend to crack. Excessive watering thereafter may result in plant food being washed away.
9. Soil must be removed and disposed of at intervals as a result of its efficiency being reduced.
10. Much of plants' energy is expended in forcing roots to penetrate hard soil.

On the other hand, plants can be grown by hydroculture methods, wherein the factors vital to plant growth may be held in proper balance and under rigid control. As a result, optimum growth is attained. For example, a plant may be supported by sand or gravel, i. e., by having its roots surrounded by sand, etc., and allowing an aqueous solution containing dissolved plant food to drip onto and seep through the inert support. Another procedure consists of supporting a plant by allowing it to rest on a wire screen with its roots extending through. The plant is held in place by means of excelsior, straw, etc. In the latter case, the plant's roots are allowed to dip in nutrient solution, whereupon food is drawn into the plant. The nutrient solution may be held in a water-tight container over which the wire screen support is suspended. This method differs from the former, i. e., the use of sand, etc., in that the nutrient solution does not come in contact with the inert supporting medium.

By nutrient solution is meant an aqueous solution containing dissolved plant food elements, including nitrogen, potassium, phosphorus, calcium, magnesium, and sulphur, along with very small proportions of iron, boron, manganese, zinc, copper, etc., which are known to be essential for plant growth. These various elements will be present as compounds containing them, such compounds, of course, being soluble in water and assimilable by the plant.

An example of a nutrient solution which has been found to serve satisfactorily for soilless culture of plants consists of a dilute aqueous solution of mono-calcium phosphate, sodium nitrate, potassium chloride, and magnesium sulphate. In addition, traces of iron sulphate, boric acid, and manganese, zinc, and copper sulphates are also added.

The present invention comprises a box, or tray or tank, of suitable size and materials in which plants may be grown without the aid of soil. It comprises means of supporting the plants, means of supplying them with plant food in the form of a nutrient solution, means of furnishing air to the plants' roots, and of allowing freedom for the growth of the plants.

An essential feature of the plant box, according to my invention, is that it furnishes means whereby growing plants may be moved about at will without disturbing the growth of these plants. For example, most window boxes for growing plants usually contain several species of flowers, etc., generally arranged in a very definite order. Now, the plant box constituting my invention allows for simple and easy rearrangement of flowers, etc., while they are actually still growing, without any harmful or deleterious effect occurring to the plants. This is very important and novel from the standpoint of decorative effects.

Figure 2:
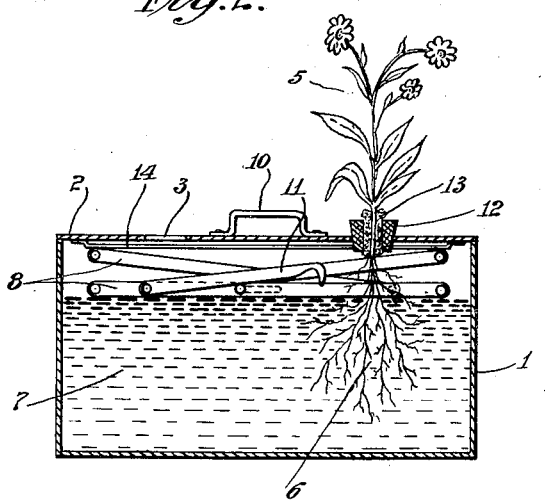
Figure 3:
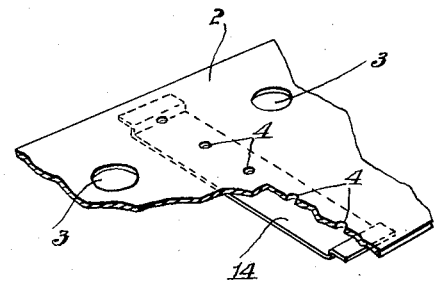

One form of my invention and its operation are illustrated by the accompanying drawing. Figure 1 represents a perspective projection of the hydroculture plant box with its lid in a raised position, showing all the essential parts. Figure 2 represents an end view of the plant box in its normal or closed position. Figure 3 is a sketch of a cut-away portion of the plant box lid, showing perforations, etc. Same parts in the three drawings are indicated by identical numbers.

In the drawing, 1 is a rectangular water-tight box to which is attached a movable lid 2. In the latter are large perforations or holes 3 in which plants are held while growing, and 4 are smaller perforations which allow air to permeate the lid and come in contact with the nutrient solution. The plant 5 is supported by the movable lid, and its roots 6, which hang beneath the movable lid, dip into nutrient solution 7 contained in the plant box. 8 are elongating arms which fasten the lid 2 to the box proper and at the same time allow the lid to be drawn out of contact with the box. A drain 9 serves to empty the box of its nutrient solution. 10 are handles by means of which the perforated lid 2 is lifted. A locking device 11 holds the lid in an elevated position. 12 is a split cork, and 13 is a wad of cotton, both being used as plant supports. 14 is a light baffle which prevents light from entering the nutrient solution chamber through perforations 4.

The general operation of the plant box is as follows: The lid 2 is raised so as to assume the position of Fig. 1. Nutrient solution 7 is poured into box 1 until the level of the solution is just below the lower tip of extension 8. Plants, rooted cuttings, or cuttings to be rooted next have their lower stems wrapped with cotton 13 or other soft material until the resulting wad fits snugly between the two halves of a split bored cork 12. The plants' roots are now inserted into one of the holes 3 and the cork pushed in firmly, thus holding the plant securely in place. The lid is now closed to conform with Fig. 2, in which position the plant roots dip or are immersed in the nutrient solution, and as a result growth of the plant is effected. Air continually circulates in and out of perforations 4 and dissolves in the nutrient solution, thereby aerating the plants. At any time during its life, the plant may be removed bodily from any one hole along with cotton 13 and cork 12, and transplanted to another hole without disturbing its growth. At intervals of one to two weeks or so, the lid is raised as in Fig. 1, the nutrient solution 7 is withdrawn through drain 9, and fresh solution added.

Some water is slowly but continually absorbed by the plant, and some is lost by evaporation into the atmosphere. When necessary, this loss may be compensated by raising the lid (as in Fig. 1) and adding the requisite quantity of water to the residual solution in the box. This operation not only assures an adequate supply of aqueous liquid in contact with the roots at all times, but also prevents undue concentration of the nutrient ingredients in the liquid medium.

Plants may be started in the box, suitable for my purpose, either as rooted cuttings, cuttings to be rooted therein, plants transplanted from soil (the soil particles being washed away), or, in some cases, even as seed. In the latter instance, that is, the planting of seed, the following procedure is one that may be followed: Through the hole in the center of a bored cork, which is in position in the lid, is pushed a slender wad of cotton rolled into the form of a wick. The lower end of this wick is allowed to dip into the nutrient solution, which, by capillary action, is drawn to the top of the cork. On the top end of this roll of cotton, and in view of sunlight, is placed the seed to be germinated. This seed, being kept moistened with nutrient solution, will germinate, and its roots will penetrate the loosely wound wad of cotton and reach into the nutrient solution. Another feature of my invention allows for putting either the maximum number, or some smaller number, of plants in the lid support. In case some plant hole does not contain a plant it is then plugged with an unbored stopper or other appropriate plug.

As a specific example of the operation of the plant box as proposed by my invention, the following is presented:

A wooden window box of the type shown in the accompanying drawing was constructed which was 18 inches in length, 6 inches in width, and 7 inches in depth (all internal measurements). The nutrient solution level was then brought up to about ½ to 1 inch below the lower tip of the lazy tongs, or to within 2 to 2½ inches of the corks. The nutrient solution was prepared by dissolving in 2½ gallons of water, 2 grams primary potassium phosphate, 3 grams of sodium nitrate, 1.5 grams of calcium chloride, and 5 grams magnesium sulphate heptahydrate. Traces of iron (as ferrous sulphate), boron (as boric acid), manganese, copper and zinc (as their sulphates) were added also. Into the plant holes, and held firmly by means of split corks and cotton, were placed small geraniums and petunias. These plants were 3 to 4 inches in height and were removed from soil, the latter being washed away completely. Under these conditions of hydroculture, the above-mentioned petunias and geraniums exhibited healthy growth.

The particular advantages of the plant box according to my invention, as hereinbefore described, are numerous. Some of these are listed as follows:

1. Plants are maintained in a sterile medium free of diseases commonly associated with soil.
2. Plants have continuous access to proper balanced food which allows for optimum growth.
3. Plants have complete freedom for growth expansion.
4. Individual plants may be removed, temporarily or permanently, from the box without harming either the plant in question or adjoining plants. Plants may also be shifted about in the box so as to give different decorative effects from time to time.
5. Plant roots have access to sufficient air for proper breathing.
6. Plants may be removed from the nutrient solution zone without the need of extraneous supports for them. All drippings automatically return to nutrient solution chamber.
7. Nutrient solution may be replenished without disturbing the plants or harming their growth.
8. Box is light-proof, and no detrimental effects of algae are encountered.
9. Plants may be inserted at any stage of growth, either as rooted cuttings or as cuttings to be rooted directly in the box.
10. Plants may be transferred from soil to this box, the soil particles being washed away.

11. Plants may be started in box as seeds which allowed to germinate, their roots reaching into the nutrient solution and their foliage growing upward.

12. When life cycle is completed, plant and roots may be removed without leaving root particles to decay and favor growth of pathogenic organisms.

13. Box is easily portable and may be used indoors or out-of-doors. When placed in rain, excess water overflows without causing any substantial damage to plants or their roots.

14. When box is to be transported, the nutrient solution may be temporarily drained, whereupon empty box may be easily handled.

15. Box may be left unattended for considerable periods of time without substantial harm to the plants, thus obviating the continual watering, etc., so essential for soil-grown plants.

It will be recognized that certain modifications may be made in the plant box hereinbefore described without departing from the principle of my invention. For example, instead of using cork supports supplemented by cotton, cork or soft rubber or other stopper-like members may be used alone. Also, cotton or other like materials may be used without the aids of corks, etc. In addition, instead of employing numerous holes for aeration purposes, screen-like sections may be inserted in the lid. Or, if desired, no perforations need be made in the lid of the box, in which case aeration may be furnished entirely by means of air from a pump, or by the addition, at intervals, of small amounts of hydrogen peroxide, etc. In another instance, the light baffles 14 (accompanying drawing) may be placed above air holes 4 instead of below them, without departing from the spirit of my invention.

Still another modification consists of constructing the box proper not of wood, metal or other opaque materials but of transparent glass-like materials of such color and shade as not to allow light of proper quality to enter which may be favorable to growth of algae.

Furthermore, instead of employing lazy tongs extensions for raising and lowering the lid, the principle of friction bolts and the like may be employed.

Although my invention has been illustrated by a rectangular box, I do not wish to be limited to this particular shape. The container may be square, circular, elliptical, or of any other suitable or desirable geometric configuration.

It will be seen from the foregoing that my invention comprises a box, or container, suitable for growing flowers and vegetables. Such containers are particularly applicable for the growing of plants by the use of aqueous nutrient solutions and without the aid of soil. My invention also comprises a perforated lid which is attached to the box proper by means of lazy tongs or other elongating arms mechanism, the lid also serving to support the plants independently of one another, said lid support being of such construction as to allow for the rearrangement of plants therein so as to obtain different decorative effects from time to time. Another phase of my invention comprises a means of support for plants which allows their roots to dip into nutrient solution and for the upper, or foliage, portions of the plants to be exposed to air. My invention further comprises a perforated box lid which is equipped to allow air to pass through it but is not permeated by light.

What I claim is:

1. As a box for the hydroculture of plants, the combination which comprises a nutrient-solution container, a lid for said container, said lid having several series of larger perforations and several series of smaller perforations, means for supporting plants in said large perforations, and light baffles, said baffles being attached to the underside of said lid and screening said smaller perforations while permitting free access of air through said smaller perforations to said container.

2. As a box for the hydroculture of plants, the combination which comprises a nutrient-solution container, a plant support consisting of a perforated lid for said container, and a light baffle attached to said lid, said baffle screening a portion of said perforated lid unoccupied by plants while permitting free access of air through said screen and perforated portion to said container.

3. As a box for the hydroculture of plants, the combination which comprises a nutrient-solution container, a lid for said container, said lid having a series of larger perforations and a series of smaller perforations, means for supporting plants in said larger perforations, and a light baffle, said light baffle being attached to said lid and screening only said smaller perforations while permitting free access of air through said smaller perforations to said container.

4. As a box for the hydroculture of plants, the combination which comprises a nutrient-solution container, a lid attached to said container by elongating mechanisms, and having a series of larger perforations and a series of smaller perforations, said smaller perforations permitting free access of air into said container, and means for supporting plants in said larger perforations.

MILLER W. SWANEY.